Dec. 7, 1965 A. HAREL 3,222,670

DATA PROCESSING

Filed Oct. 13, 1961 2 Sheets-Sheet 1

INVENTOR.
ABRAHAM HAREL

BY

Roland A. Anderson

ATTORNEY

Dec. 7, 1965 A. HAREL 3,222,670

DATA PROCESSING

Filed Oct. 13, 1961 2 Sheets-Sheet 2

INVENTOR.
ABRAHAM HAREL

BY

[signature]

ATTORNEY 3,222,670
DATA PROCESSING
Abraham Harel, Framingham, Mass., assignor, by mesne assignments, to the United States of America as represented by the United States Atomic Energy Commission
Filed Oct. 13, 1961, Ser. No. 144,952
7 Claims. (Cl. 340—347)

This invention relates to data processing and is directed particularly to analog-to-digital conversion.

In the art of automatic data gathering or automatic control, such as industrial process control, it is often necessary to convert an analog quantity, which may represent some variable such as an industrial process variable, into a digital quantity. In one such application the analog quantity, a voltage, included frequency components well beyond the frequency range (the sampling rate) at which the analog-to-digital converter was capable of operating. This particular converter was capable of sampling and converting 40,000 samples per second, however, the analog voltage included frequency components well beyond 40,000 cycles per second.

An object of the present invention is to provide an improved arrangement for converting an analog quantity to a digital quantity.

Another object of the invention is to provide an improved arrangement for converting an analog quantity to a digital quantity employing an analog-to-digital converter which is capable of sampling and converting the anaolg quantity at a rate substantially lower than that of the higher frequency components of the analog quantity, at the same time retaining at least some of these higher frequency components.

According to the invention, the analog signal, which is to be converted to digital values, is recorded in an analog, continuous form on successive portions of a high speed cyclical recording medium. The medium, for example, may be a magnetic drum, a magnetic disc, a system of closed loop delay lines, or other cyclical recording medium, however, for purposes of the present discussion, it is assumed to be a drum. The analog signal is recorded during not more than one revolution of the drum. Each $n$th line of the analog track on which the signal is recorded is sampled (read out) as the drum revolves. Thus, $n$ revolutions of the drum are required to read out the entire recorded signal, where $n$ is an integer greater than one. The quantity is preferably equal to or greater than the ratio of the sampling rate required to convert the analog signal to digital form without loss of the higher frequency components of the analog signal, to the highest sampling rate at which the analog-to-digital converter is capable of operating. The signals read out of the drum are applied to an analog-to-digital converter. The digital binary numbers, comprising $m$ bits each, which are produced by the converter themselves may be recorded on $m$ parallel tracks on each $n$th line of the same drum, or in storage locations of any other suitable storage device which permits selection of the locations in correspondence with the sampling selection.

The rate at which the recorded analog signal is sampled and converted in the process described above, is lower than the highest significant frequency of the recorded analog signal but, very significantly, the information content of these high frequencies need not be lost. For example, in the case in which $n$ is 10, the actual sampling and analog to digital conversion rate is only one-tenth that of the recording rate. This makes it possible for the analog-to-digital converter to handle the analog signal, and retain the benefit of the higher frequency components, even though the sampling and conversion rate of the converter may be much lower than the rate at which the analog signal changes its value. Further, in a preferred form of the invention, although the $m$ bit parallel binary "words" (numbers) successively generated by the converter, are recorded on the drum in interlace fashion during $n$ drum revolutions, the numbers appear in proper sequence on successive lines of the drum and may be read out proper sequential order in one drum revolution (the $(n+1)$th drum revolution).

The invention is described in greater detail below and is illustrated in the following drawings of which:

Figure 1:
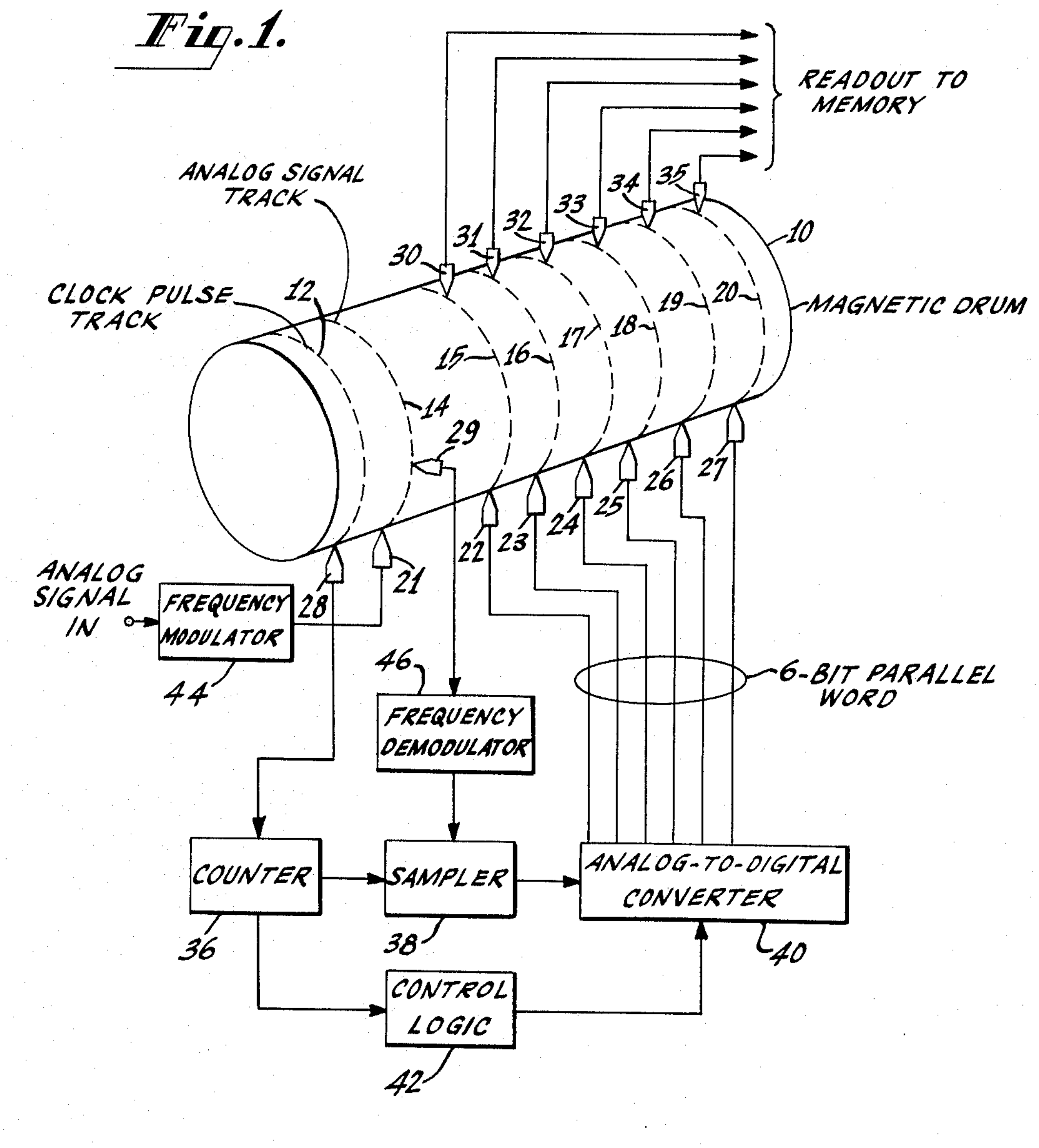
FIG. 1 is a block diagram of the present invention.

The cyclical recording medium shown in FIG. 1 is a magnetic drum 10. The first track 12 on the drum has recorded thereon clock pulses which preferably are equally spaced from one another. The second track 14 is for the purpose of recording an analog signal. Tracks 15–20 are for recording binary words. There are seven writing heads illustrated, one for each of tracks 14–20. These heads are legended 21–27, respectively. There are eight reading heads illustrated, one for each track on the drum and these heads are legended 28–35.

Reading head 28 for the clock pulse track is connected to a counter 36. The purpose of the counter is to produce an output pulse for each $n$th clock pulse where $n$ is an integer greater than one. In the embodiment of the invention discussed later, $n$ is equal to 4. The counter 36 may be any one of a number of well-known counters such as a ring counter, a scale of $n$ counter or the like.

The purpose of the sampler 38 is to apply a signal, picked up by the read head 29, from the analog signal track, to the analog-to-digital converter each time the counter 36 produces an output pulse. The sampler 38 may include, for example, an amplifier which is normally maintained cut off but which is rendered conductive for the duration of a pulse from the counter 36 applied to the amplifier control element by the lead between blocks 36 and 38. The amplifier produces an output pulse having an amplitude proportional to the corresponding portion (sample) of the recorded signal. The sampler 38 also includes a storage circuit as, for example, a Miller store, which receives the output pulse of the amplifier and stores the same for a duration at least equal to that between successive pulses from counter 36. The function of the sampler, in brief, is to sample the analog voltage during spaced time intervals and to "hold" this voltage for an amount of time sufficient to permit the analog-to-digital converter 40 to perform its function. A suitable sample and hold circuit may be found in Covely et al., Patent No. 2,995,744, titled, "Automatic Correction Circuit for Stored Electrical Data." Another such circuit employing feedback is described in Sublette et al., Patent No. 2,990,540, titled "Control Systems." A suitable analog-to-digital converter 40 may be found in Ledley, R. S.: "Digital Computer and Control Engineering," McGraw-Hill Book Company, Inc., New York, 1960, pages 739 to 763, particularly at pages 744–747. Another such analog-to-digital converter is described in Towles, W. B.: "A Transistorized Analog-to-Digital Converter," Electronics, volume 31, pages 90–93, August 1, 1958.

The purpose of the analog-to-digital converter 40 is to convert the analog signal sampled by the sampler 38 to a parallel $m$ bit binary number (in the present example $m=6$). The binary number is applied to the six parallel tracks 15–20 by write heads 22–27 respectively.

The frequency modulator 44 in the analog signal input circuit frequency modulates the analog signal onto a carrier. The modulator carrier signal is recorded on the analog signal track 14. The frequency demodulator 46 between analog signal read head 29 and the sampler 38 demodulates the signal from the carrier. The purpose of employing frequency modulation rather than directly recording the analog signal is to improve the fidelity of the recorded and reproduced signal.

The block 42 legended control logic includes circuits which control the sequency of operations in the computer in which the present invention is located. Of these circuits all of which are well known, only one of directconcern in the present invention is discussed. This is the circuit which produces clock pulses for the converter. This circuit may include a delay means and amplifier. The delay means receives the pulses from counter 36 and the amplifier amplifies the delayed pulses. The delay interval is made sufficient to permit the analog-to-digital conversion of the voltage applied by sampler 38. The delayed output pulses of control logic stage 42 may be applied to output gates in the analog-to-digital converter 40 to gate out the bits of a binary number corresponding to the analog quantity.

Figure 2:
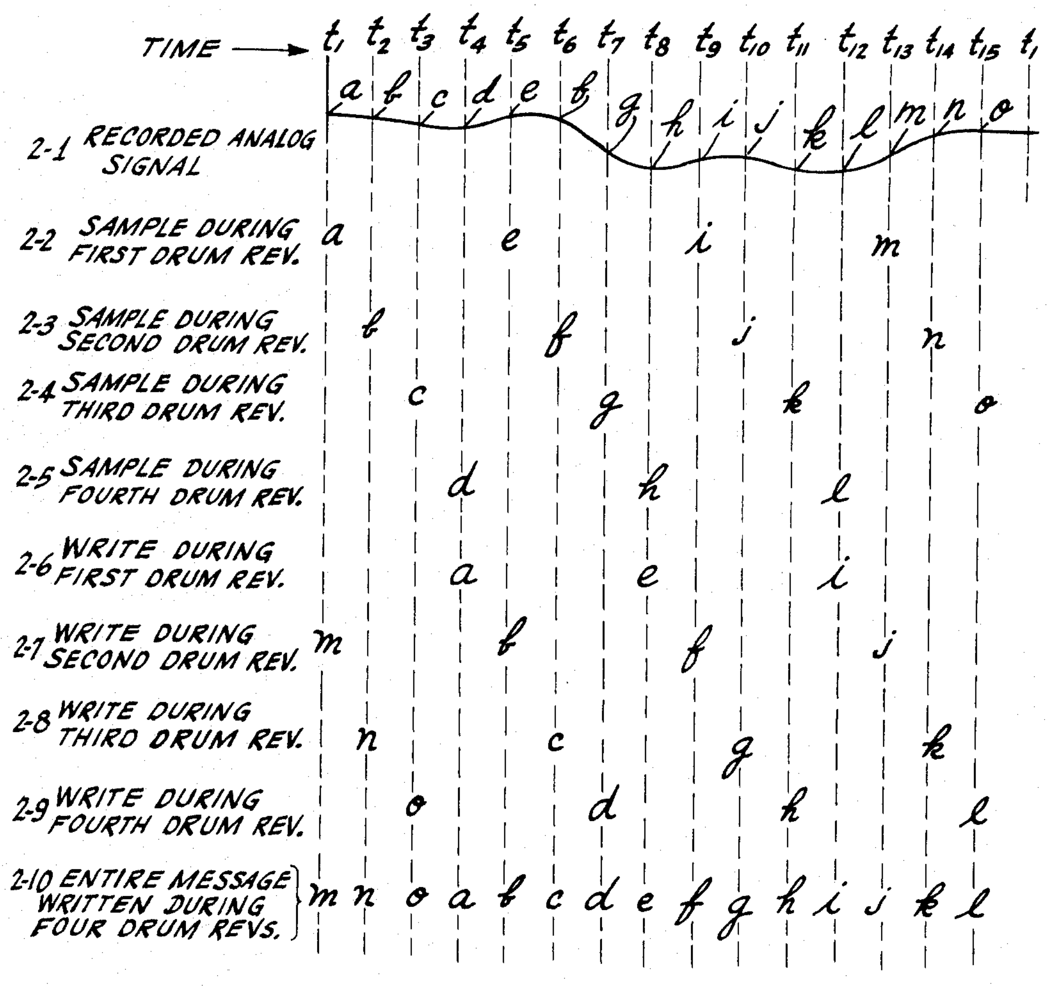
FIG. 2 is a table to help explain the operation of the invention.

The operation of the circuit of FIG. 1 may be better understood by referring to FIG. 2. For the purposes of the explanation, the magnetic drum 10 is assumed to have 15 lines. These lines pass in succession under the drum heads. Taking the read head 29 for the signal track as one example, the lines pass under this head during intervals $t_1$, $t_2$, and so on through $t_{15}$ and, since the drum rotates at a uniform speed, the times $t_1$ through $t_{15}$ are equally spaced from one another.

The analog signal is shown at line 2–1 as a varying amplitude signal; however, it is to be understood that it is recorded as a frequency modulation of a carrier which intensity-modulates the magnetic surface of the track. In other words, the frequency of the sinusoidal carrier recorded along the track corresponds to the variations in amplitude of the signal shown as a curve at line 2–1.

For purposes of identification, the portions of the signal on successive lines on the track corresponding to the times $t_1$ through $t_{15}$ are legended *a–o*, respectively, on line 2–1. This signal is recorded on the analog signal track during one drum revolution by recording head 21. The recorded signal is sampled in interlaced fashion by the reading head 29 and sampler 38. For the purposes of this discussion it is assumed that each fourth line of the drum is sampled. As can be seen in line 2—2, at time $t_1$ during the first drum revolution, portion *a* of the recorded analog signal is sampled. At time $t_5$, portion *e* of the signal is sampled. At the times $t_9$ and $t_{13}$, portions *i* and *m*, respectively, of the signal are sampled. During the second drum revolution, the portions *b, f, j, n,* of the signal are sampled as shown at line 2–3. During the third and fourth drum revolutions the portions *c, g, k, o* and *d, h, l* are sampled, respectively, as indicated at lines 2–4 and 2–5, respectively. Thus, it requires four drum revolutions to sample all lines of track 14.

Sample *a* of the recorded analog signal is applied to the analog-to-digital converter 40 as soon as it is received by the sampler 38 and maintained at the same level until the next sample is taken. The analog-to-digital converter 40 requires a certain amount of time to translate the analog signal to an *m*-bit binary number( here $m=6$). For example, it may require the time $t_1$ to $t_4$ to complete the conversion. After the binary number has been generated, it is recorded in parallel on *m* tracks (15–20) of the magnetic drum. Then a new sample is taken, and a new conversion started and so on. FIG. 2 illustrates this process schematically and shows that the portion *a* of the analog signal is written in digital fashion on a line three lines from where the sample is taken. This, incidentally, assumes that the read head 29 is aligned with the writing heads 22–27 which may or may not be the case. For example, if the head 29 is 10 lines from the heads 22–27 and the conversion delay is 3 lines, the binary word will be written 13 lines from the line from which the sample is taken.

The next portion of the analog signal which is sampled during the first drum revolution is *e*. The binary number corresponding to *e* is written four lines from the one on which the binary number corresponding to *a* is written. After four drum revolutions, as shown at 2–6 through 2–9, the entire analog signal is sampled and converted, and the binary numbers corresponding to the samples are entirely written on the drum. Portion 2–10 of FIG. 2 shows that even though the analog signal is sampled and converted in interlaced fashion and the binary numbers corresponding to the analog signal are recorded in interlaced fashion, the finally recorded binary numbers are in precisely the same sequence as the corresponding parts of the recorded analog signal. Thus, this sequency of numbers can be read out (in parallel) during a single drum revolution at a fast rate by the heads 30–35. The read-out numbers can be applied to a computer memory or some other data processing element.

Summarizing what has been described, an incoming analog signal is recorded on one track of the drum during one drum revolution. The recorded analog signal is sampled in interlaced fashion and the samples are converted by a relatively slow converter to binary numbers. The binary numbers are recorded on the drum in interlaced fashion. The recorded binary numbers appear in the proper sequence even though applied to the drum in interlaced fashion and may be read out at a fast rate in one drum revolution.

It should be appreciated that the process described can be substantially speeded up if more equipment is used. For example, in the case in which $n=4$ (the one discussed above), four rather than one of each of elements 29, 38, 40, 45 and 22–27 may be used. Each analog-to-digital converter 40 would be connected to a separate sampler 38, and each sampler would be connected to a separate head 29 spaced along track 14. This arrangement makes it possible to do four analog-to-digital conversions simultaneously and to write the four digital numbers thereby obtained onto four lines of the six parallel tracks simultaneously. The entire conversion process would therefore require only one drum revolution rather than the four required with equipment shown in FIG. 1.

As already mentioned, the invention is not limited to the use of a magnetic drum. As employed in the claims, the term "drum" is to be understood to include equivalent apparatus such as a plurality of discs and other well-known equivalents.

What is claimed is:

1. An analog-to-digital converter comprising, in combination, a cyclical recording medium which is operative at a speed adequate to record a given high frequency analog signal; means for recording said signal on said medium in not more than one cycle of the medium; and an analog-to-digital converter means which is operative at a speed substantially slower than that required to convert the higher frequency components of the signal to digital form for interlacing converting the entire recorded signal to digital data and recording the digital data on the medium, both during a period substantially greater than that required to record said signal.

2. An analog-to-digital converter comprising, in combination, a cyclical recording medium which is operative at a speed adequate to record a given high frequency analog signal; means for recording said signal as an intensity modulation of one track of said medium in not more than one cycle of the medium; and an analog-to-digital converter means which is operative at a speed substantially slower than that of said medium for interlacing converting the entire recorded signal to digital data and recording the digital data on a plurality of other tracks of the medium, both during a plurality of cycles of said medium.

3. An analog-to-digital converter comprising, in combination, a drum which is operative at a speed adequate to record a given analog signal; means for recording said analog signal on successive lines of one track of the drum during one drum revolution; means for sampling the signal stored at each *n*th line of the record during *n* revolutions of the drum, where $n$ is one; means for converting each sampled analog signal to a digital; and means for recording said digital signals on each $n$th line of a plurality of tracks on said drum during said $n$ revolutions of said drum.

4. An analog-to-digital converter comprising, in combination, a magnetic drum which is operative at a speed adequate to record a given analog signal; means for recording said analog signal in frequency modulated form as an intensity modulation of successive lines of one track of the drum during one drum revolution; means for sampling the signal stored at each $n$th line of the track during $n$ revolutions of the drum, where $n$ is one; means for converting each sampled analog signal to a digital signal; and means for recording said digital signals on each $n$th line of a plurality of tracks on said drum during said $n$ revolutions of said drum, whereby the recorded digital signals corresponding to successive lines of the sampled signals themselves are on succeesive lines of the drum and may be read out during the $(n+1)$th one of said revolutions.

5. In an analog-to-digital converter system for converting a high frequency analog signal of varying amplitudes to digital signals of pulses corresponding in number to said varying amplitudes, comprising a rotatable drum having a plurality of memory tracks, a first of said tracks having clock pulses thereon, means for storing on a second of said tracks a first signal corresponding to the amplitude variation of said entire analog signal, means for converting said first signal into digital signals consisting of pulses whose number is proportional to the amplitudes of said first signal, and means for storing said pulses, the improvement, comprising read out head means for reading out and articulating said entire first signal in a first interlaced sequence of second signals, a selector for supplying said second signals to said converter means in said interlaced sequence in response to said clock pulses for converting said second signals into interlaced digital third signals, and means responsive to said clock pulses for supplying said third signals in the form of digital third pulses to further tracks on said drum for providing a sequence of digital third signals exactly corresponding to the sequence of said analog signal whereby said entire analog signal is converted and stored on said drum in digital pulses corresponding in number to the varying amplitudes of said analog signal with a slow analog-to-digital converter.

6. A cyclic synchronous analog-to-digital converter system for converting a high frequency analog signal of varying amplitudes to digital signals of pulses corresponding in number to said varying amplitudes, comprising a rotatable drum having a plurality of memory tracks, a first of said tracks having clock pulses thereon, means for storing on a second of said tracks a first signal corresponding to the varying amplitudes of said analog signal, and means for reading-out said stored first signal, converting it into digital signals consisting of third pulses whose number is proportional to the varying amplitudes of said analog signal, and storing said third pulses on further tracks of said drum, said latter means having a read-out head for reading out said stored first signal, a selector responsive to said clock pulses for articulating said entire first signal in interlaced time spaced fourth signal segments and sequentially separately storing said fourth signal segments, a converter for converting said fourth signal segments to interlaced third pulse signal segments, and writing heads responsive to said clock pulses for unlacing said third pulse signal segments and storing them on further tracks on said drum whereby an entire high frequency analog signal of 40,000 cycles per second can be stored on said drum and converted and stored in digital form on said drum by a slow acting analog-to-digital converter in precisely corresponding parts.

7. A cyclic synchronous analog-to-digital converter for translating analog information to digital information, where the analog information is in the form of a high frequency, varying amplitude signal and the digital information is in the form of digital signals having pulses corresponding in number to said varying amplitudes, comprising a rotatable drum having a plurality of memory tracks, a first of said tracks having timing pulses thereon, means for storing said analog signal as a frequency modulation of a carrier which intensity modulates the magnetic surface of a second of said tracks in the form of a first signal containing first analog information corresponding to the amplitude variation of said analog signal, means for reading out said first signal, means for converting said read out first signal into a demodulated second signal containing analog information corresponding to said first analog information carried by said first signal, means for articulating said second signal having a counter responsive to said timing pulses for producing spaced in time third signals containing analog information the parts of which together correspond to the whole of said analog information carried by said second signal, converter means for converting each of said third signals into digital fourth signals having digital pulses providing digital information corresponding to said analog information carried by said third signal, and means responsive to said counter for recording all of said digital fourth signals on further tracks of said drum whereby the analog information contained in the amplitude variations of said entire high frequency analog signal can be stored on said drum, and interlaced, converted and stored in unlaced digital pulses on said drum by a slow speed analog-to-digital converter means.

References Cited by the Examiner

UNITED STATES PATENTS

| | | | |
|---|---|---|---|
| 2,587,532 | 2/1952 | Schmidt | 340—172.5 |
| 2,713,676 | 7/1955 | Fleming | 340—174.1 |
| 2,918,657 | 12/1959 | Crampton et al. | 340—174.1 |
| 2,946,044 | 7/1960 | Bolgiano et al. | 340—172.5 |
| 3,036,772 | 5/1962 | Pughe et al. | 235—150 |

OTHER REFERENCES

U.S. Government Research Report, vol. 34, No. 3 PB 147692, design of a Sampled Data Controller Using Transistor Logic, pages 318–319, Sept. 16, 1960.

J. Greenstein, A Two-Channel Data Link for Combined Analog Digital Simulation, AIEE Transactions Paper, Sept. 29, 1959.

MALCOLM A. MORRISON, *Primary Examiner.*